United States Patent [19]

Vaughan et al.

[11] Patent Number: 4,661,332
[45] Date of Patent: Apr. 28, 1987

[54] ZEOLITE (ECR-18) ISOSTRUCTURAL WITH PAULINGITE AND A METHOD FOR ITS PREPARATION

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 759,847

[22] Filed: Jul. 29, 1985

[51] Int. Cl.$^4$ ............................................. C01B 33/20
[52] U.S. Cl. .................................... 423/326; 502/60; 502/61; 502/62; 423/328; 423/329
[58] Field of Search ..................... 423/328, 329, 326; 502/60, 62, 64, 77

[56] References Cited

U.S. PATENT DOCUMENTS

| | | | |
|---|---|---|---|
| 3,700,585 | 10/1972 | Chen et al. | 208/111 |
| 3,972,983 | 8/1976 | Ciric | 423/328 |
| 4,060,590 | 11/1977 | Whittam et al. | 423/328 |
| 4,247,416 | 1/1981 | Doherty et al. | 423/328 X |

*Primary Examiner*—John Doll
*Assistant Examiner*—Jackson Leeds
*Attorney, Agent, or Firm*—E. Thomas Wheelock; Henry E. Naylor

[57] ABSTRACT

This invention relates to a synthetic zeolite, designated as ECR-18, having a structure similar to the mineral paulingite and a process for preparation of the zeolite.

9 Claims, 2 Drawing Figures

ZEOLITE (ECR-18) ISOSTRUCTURAL WITH PAULINGITE AND A METHOD FOR ITS PREPARATION

FIELD OF THE INVENTION

This invention relates to a synthetic zeolite, designated as ECR-18, having a structure similar to the mineral paulingite and a process for preparation of the zeolite.

BACKGROUND OF THE INVENTION

Zeolites, both natural and synthetic, have been used in a variety of catalytic and adsorptive operations. Most zeolitic materials are porous ordered aluminosilicates having a definite (although often undetermined) crystal structure. The structure may have a number of small cavities interconnected by a number of still smaller channels. These cavities and channels are uniform in size within a certain zeolitic material. The above-mentioned catalytic and adsorptive processes make use of these cavities and channels since by proper choice of zeolite, the zeolite channels will reject some molecules because of their size and accept others.

These zeolites typically are described as a rigid three-dimensional framework of silica and alumina wherein the silica and alumina tetrahedra are linked through common oxygen atoms. The charge balance of the zeolite may be satisfied by inclusion of a proton, metal, or ammonium cation. The catalytic and adsorptive properties of the zeolite may be varied by changing the ions within the zeolite. Conventional ion exchange techniques may be used to change those cations.

Similarly, there are a large number of both natural and synthetic zeolitic structures. The wide breadth of such numbers may be understood by considering the work *Atlas of Zeolite Structures* by W. M. Meier and D. H. Olson. Many natural zeolites are impossible, or at least quite difficult, to synthesize using the present state of the art. See, Robson, Chem. Tech., (1978), p. 180.

There are a large number of methods for producing zeolitic materials. Many of these synthetic methods utilize mixtures of alumina, silica, a base and water and control the typical zeolite produced by varying the reactant concentration, temperature of reaction, and time of reaction. Other methods of controlling the type of zeolite produced include the use of zeolitic seeds as nucleation centers or organic ammonium salts as "templates" in the reaction mixture.

The use of quaternary ammonium salts as templates or reaction modifiers in the preparation of synthetic crystalline aluminosilicates (zeolites), first discovered by R. M. Barrer in 1961, has led to preparation of a number of zeolites which are not found in nature. For example, U.S. Pat. No. 4,086,859 discloses preparation of a crystalline zeolite thought to have the ferrierite-like structure (ZSM-21) using a hydroxyethyl-trimethyl sodium aluminosilicate gel. A review provided by Barrer in *Zeolites*, Vol. I, (1981) p. 136 shows the zeolite types which are obtained using various ammonium organic bases as cation. In addition, Breck, *Zeolite Molecular Sieves*, John Wiley (New York, 1974), pp. 348–378, provides a basic review of zeolites obtained using such ammonium cations in the synthesis thereof.

The zeolite of this invention is produced using an organic ammonium ion (tetraethylammonium) in the synthesis mixture. It has the general chemical composition:

$$(TEA,Na)_2O:(Al,Ga)_2O_3:3\text{-}10\ SiO_2.$$

However, unlike any other synthetic zeolites previously disclosed (See, H. E. Robson, supra) the inventive zeolite has a structure similar to the mineral paulingite. Paulingite is a very rare mineral which is classified as a member of the faujasite group. The mineral was first reported by Kambandke, Amer. Mineral. 45, p. 79, 1960. The mineral's structure has been reported to be complex and its composition to be:

$$(K_2Na_2CaBa)_{76}:(Al_{152}Si_{525}O_{1354}):700\ H_2O.$$

See, Gordon et al, Science 154, p. 1004, 1966.

Clearly, the synthetic zeolite (ECR-18), as disclosed below in greater detail, is not disclosed in the prior art. Similarly, the process for producing ECR-18 has not been previously disclosed.

SUMMARY OF THE INVENTION

The present invention relates to a zeolite, designated for convenience herein as ECR-18, having the chemical composition, expressed in terms of mole ratios of oxides, in the range:

$$(Na, TEA)_2O:(Al,Ga)_2O_3:3\ to\ 20\ SiO_2.$$

The more preferred composition for the zeolite is in the range:

$$(Na,TEA)_2O:(Al,Ga)_2O_3:4\ to\ 10\ SiO_2.$$

These compositions, as produced, may also have up to about 12 moles of water per mole of $(Al,Ga)_2O_3$. The zeolite has a very high void volume and consequently is suitable for use as a sorbent having great capacity. Indeed, only the faujasite polymorphs have been reported as having greater void volume than paulingite.

The x-ray diffraction pattern for ECR-18 has the major peaks indicated in Table I below.

The aluminosilicate herein may be used as a sorbent or as a catalyst for hydrocarbon conversion.

In another embodiment of this invention, the novel zeolite may be prepared by a process comprising:

(a) preparing a reaction mixture comprising a mixture of an oxide of sodium and a tetraethylammonium (TEA) salt, water, a source of silica, a source of alumina, and sodium aluminosilicate nucleating seeds, said reaction mixture having a composition, in terms of mole ratios of oxides, within the following ranges:

| | |
|---|---|
| $(Na, TEA)_2O:Al_2O_3$ | 1.8 to 6.0 |
| $SiO_2:Al_2O_3$ | 4.0 to 22 |
| $H_2O:Al_2O_3$ | 80 to 320 | and said seeds being present in an amount to yield 0.1 to 10 mole percent of the total final alumina content in said aluminosilicate;

(b) blending the reaction mixture sufficiently to form a substantially homogeneous mixture;

(c) maintaining the reaction mixture at a temperature between about 80° C. and 260° C. under autogenous pressure for a sufficient period of time to form crystals of the aluminosilicate; and (d) recovering the aluminosilicate crystals.

It will be understood that the compositions herein may contain some waters of hydration which may be at least partially removed when the zeolites are employed as sorbents or catalysts.

DESCRIPTION OF THE PREFERRED EMBODIMENTS

The aluminosilicate herein generally will have the formula, in terms of mole ratios of oxides, in the range:

$$(TEA,Na)_2O:(Al,Ga)_2O_3:3-20\ SiO_2$$

The preferred composition for the zeolite is:

$$(TEA,Na)_2O:Al_2O_3:4\ to\ 10\ SiO_2$$

The zeolite has a structure similar to or is generally isostructural with the mineral paulingite. It is, however, based on a sodium and TEA cation system. The material has a significant void pore volume, e.g., greater than about 0.40 cc/cc of zeolite, often as much as 0.47 cc/cc of zeolite. The significant pore value indicates that it has utility as a sorbent with substantial capacity, or as a small pore catalyst.

The x-ray diffraction pattern for ECR-18 has the following major peaks:

TABLE 1

| Essential Peaks in X-ray Diffraction Pattern of ECR-18 | | |
|---|---|---|
| 2θ | dÅ | Intensity |
| 10.66 | 8.29 | vs. |
| 12.83 | 6.90 | vvs. |
| 14.25 | 6.21 | m |
| 17.82 | 4.97 | m |
| 18.55 | 4.78 | s |
| 20.23 | 4.39 | m |
| 20.83 | 4.26 | m |
| 21.75 | 4.08 | m |
| 24.83 | 3.58 | vs. |
| 26.62 | 3.35 | vs. |
| 27.35 | 3.26 | vvs |
| 28.52 | 3.12 | s |
| 28.98 | 3.08 | vvs. |
| 29.91 | 2.99 | vs. |
| 31.40 | 2.846 | m |
| 32.85 | 2.724 | m |
| 34.23 | 2.617 | s. |

The pattern may be indexed on the basis of a cubic unit cell having a unit cell edge of about 35 Å ± 1 Å.

Figure 2:
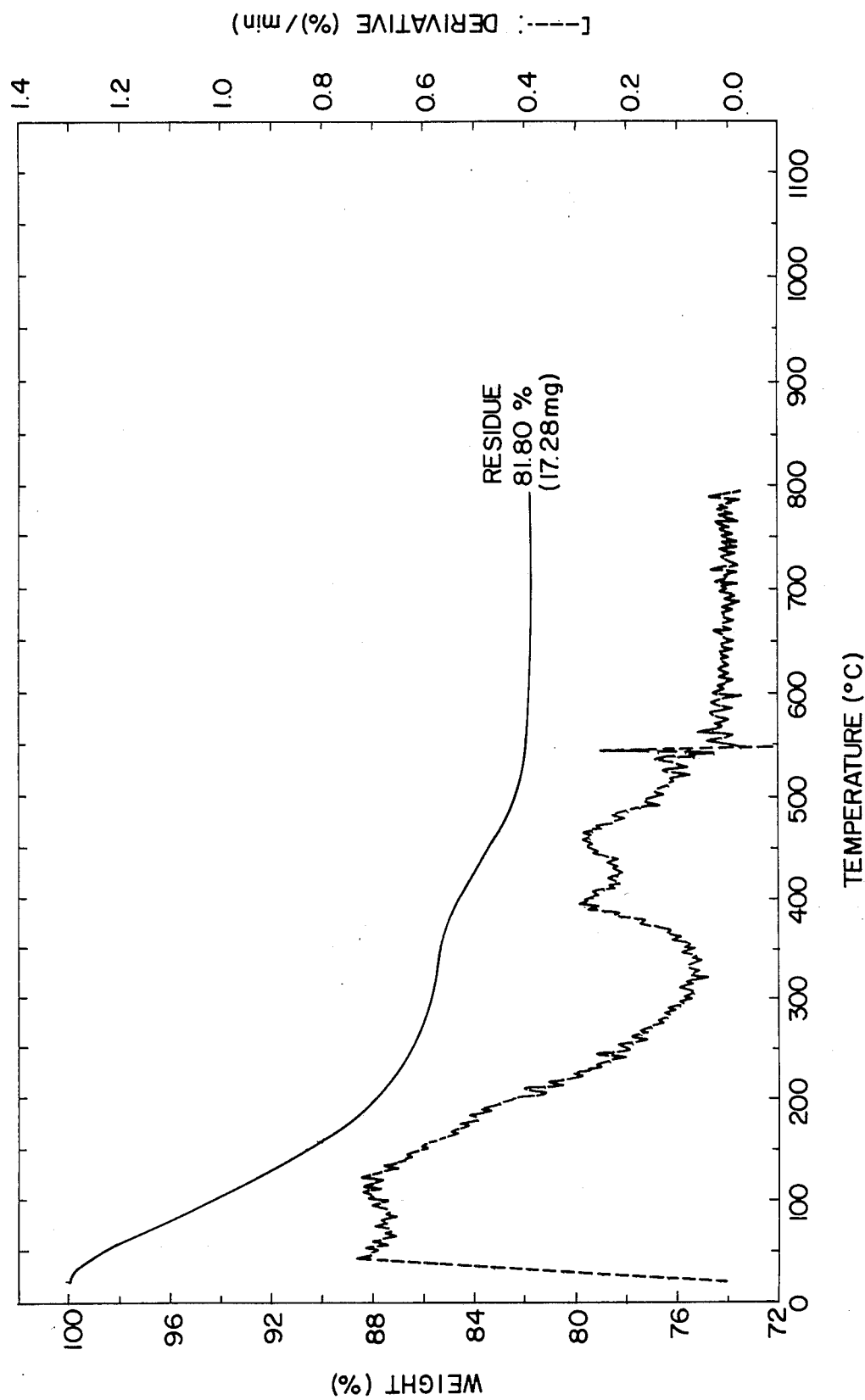

Minor variations in the mole ratios of the oxides within the ranges given in the chemical formulas above do not substantially alter the structure or properties of the zeolite. In addition, the number of waters of hydration will not be the same for each preparation and will depend mainly on the degree to which the aluminosilicate is dried, and the amount of TEA template. As is shown in FIG. 2 (discussed in more detail below), the organic template decomposes and leaves the zeolite at temperatures about 350° C. to 500° C. when calcined in air. The thermogram further shows that the TEA ion is trapped in two non-equivalent sites.

In order to convert the inventive zeolites into catalysts, exchangeable cations may partially or fully replace the sodium ions wherever they may be found within the structure. The exchangeable cation may be metals from any one of Groups I through VIII of the Periodic Table or rare earth metals, depending on the end use desired. Preferably, the cations will be mono-, di- and trivalent metal cations, particularly from Groups I, II or III of the Periodic Table, such as barium, calcium, cesium, lithium, mangesium, potassium, strontium, zinc, or the like, or hydrogen, rare earth metals, or ammonium or other alkylammonium ions. The presence of these exchangeable cations will generally not cause a substantial alteration of the basic crystal structure of the aluminosilicate. Particularly preferred are mono- and divalent cations, as they are more easily included in the pores of the zeolite crystal. Any ion exchange technique may be employed such as those discussed, for example, in U.S. Pat. No. 3,216,789.

The aluminosilicate herein may be prepared by a process in which a reaction mixture, generally a gel or slurry, is formed of an oxide of sodium, water, a source of silica, a source of alumina, and sodium zeolitic (aluminosilicate) nucleating seeds. The oxide of sodium may be, e.g., sodium hydroxide. The sodium may be partially replaced with a minor portion of other monovalent cations such as TEA. The silica may be derived from sources such as, e.g., silica gels, silica acid, aqueous colloidal silica sols as described, for example, in U.S. Pat. No. 2,574,902, reactive amorphous solid silicas such as fume silicas and chemically precipitated silica sols, and potassium or sodium silicate, preferably sodium silicate. The alumina may be derived from sources such as, e.g., activated alumina, gamma alumina, alumina trihydrate, sodium aluminate, alum, kaolin, metakaolin or the like. It is noted that the sodium oxide may be provided not only directly by adding, e.g., sodium hydroxide to the mixture, but also indirectly from the source of silica and/or the source of alumina if, for example, sodium silicate and potassium aluminate (prepared by dissolving KOH and $Al_2O_3.3H_2O$ in water) are respectively employed as at least one of the silica and alumina sources. The preferred sources of alumina are sodium aluminate and an aluminum salt selected from the chloride, sulfate and nitrate salts. The particular anion does not seem to have a major influence on the products.

The aluminosilicate nucleating seeds, if used in the reaction mixture, also known as zeolitic nucleation centers, comprise of a slurry of zeolite solids having the following components: $SiO_2$, $Al_2O_3$, $Na_2O$ and $H_2O$. Generally, the seeds will have an average particle size less than 0.05 microns. The composition of the nucleating seeds in the slurry may be in the approximate ranges, in terms of mole ratios of oxides, as follows:

$$4\ to\ 30\ Na_2O:1\ to\ 9\ Al_2O_3:3\ to\ 30\ SiO_2:250\ to\ 2000\ H_2O$$

Such slurries of nucleating seeds may be prepared by the process disclosed in U.S. Pat. Nos. 3,433,589; 3,808,326 and 4,178,352, the disclosures of which are incorporated by reference. In general, the preparation procedure involves mixing of sodium silicate, sodium aluminate and water together and aging the resulting slurry at about 0° to 90° C. for about 1 to 500 hours, with lower temperatures requiring a longer period of time. Preferably, the slurry is aged at about 15° to 40° C. for about 20 to 400 hours and the zeolite centers have compositions in the range:

$$10\ to\ 16\ Na_2O:1\ to\ 9\ Al_2O_3:10\ to\ 15\ SiO_2:250\ to\ 2000\ H_2O.$$

When used, the amount of nucleating seeds present in the reaction mixture is expressed in terms of the percentage of the total molar alumina content in the aluminosilicate product which is ultimately recovered on crystallization. Thus, for example, if 5 molar percent of the nucleating seeds is added to the mixture, the seeds are contributing 5% of the total molar amount of alumina in the zeolite product recovered. In general, the seeds are present in an amount to yield 0.1 to 20 mole percent of the total final alumina content of the product, and preferably 0.1 to 5 mole percent.

Slurries comprising recycled products of the process disclosed herein may also serve as nucleation seeds.

The relative amounts of ingredients in the reaction mixture will be such that the mixture has a composition, in terms of mole ratios of oxides, within the following ranges:

| Oxide Constituents | Usual Ranges of Mole Ratios | Preferred Ranges of Mole Ratios |
|---|---|---|
| $Na_2O:Al_2O_3$ | 0.4 to 3.4 | 0.5 to 2.4 |
| $(TEA)_2O:Al_2O_3$ | 0.8 to 4.5 | 1 to 3.5 |
| $SiO_2:Al_2O_3$ | 4 to 22 | 5 to 16 |
| $H_2O:Al_2O_3$ | 80 to 360 | 100 to 260 |

The order of mixing the ingredients is not essential, and all ingredients may be added simultaneously. In one preferred method of preparation a sodium silicate solution, a slurry of nucleating seeds and an organic TEA salt solution are added to a blender, followed by slow addition, with mixing, of a sodium aluminate solution and an alum solution. Additional water is added to the resulting slurry. The reaction mixture is ordinarily prepared in a container made of glass, TEFLON, or metal or the like which should be closed to prevent water loss. When the process is practiced without using seeds, the same sequence is used except that the seeds are excluded.

After the reaction mixture is formed it may be homogenized by thorough blending so as to be substantially homogeneous in texture. This step is to ensure that the aluminosilicate product ultimately obtained is not a mixture of products and thus impure.

The homogenized mixture is then placed in a reactor, ordinarily one which can withstand elevated pressures such as a tetrafluoroethylene-lined jar or an autoclave, where it is maintained at a temperature of between about 80° C. and 260° C., preferably 80° and 200° C., and, for commercial purposes, preferably no greater than 180° C. When the homogenized mixture is heated it is maintained at autogeneous pressures which will depend on the temperature employed. Lower pressures of 1 atm may be adequate for temperatures at the lower range but at higher temperatures up to 260° C. pressures of up to about 80 atm or higher may be achieved. The amount of time required for heating will depend mainly on the temperature employed, so that at 100° C. the heating may be carried out, e.g., for up to 15 days or more, whereas at 150° C. or more the time period may be, e.g., 5 days. In any event, the heating is carried out until crystals are formed of the aluminosilicate zeolite product, i.e., ECR-18.

The crystallization time may be shortened by seeding the slurry before or after the blending step with minor amounts of zeolite ECR-18 crystals of this invention which are preferably chopped at low temperatures and size range less than about 0.05 $\mu$m before that seeding.

When the aluminosilicate crystals have been obtained in sufficient amount, they are recovered by cetrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried, and then calcined in an oxygen-containing atmosphere to remove the organic ions. Once the large organic ions are removed, the structure is accessible to larger molecules, and is useful as a catalyst or sorbent.

EXAMPLES

The examples which follow illustrate the invention. In all examples, parts and percentages are given by weight and temperatures in degrees Centigrade unless otherwise noted.

EXAMPLE 1

A reaction mixture having the following oxide ratios:

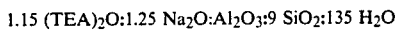

1.15 $(TEA)_2O$:1.25 $Na_2O$:$Al_2O_3$:9 $SiO_2$:135 $H_2O$ was made by first dissolving 17 gm sodium aluminate (Fisher Scientific Co.) in 40 gm $H_2O$, and 0.82 gm aluminum sulfate dissolved in 5 gm $H_2O$. These were added sequentially to a mixture of 95.2 gm Ludox HS-40 silica (Dupont Co.), 60.9 gm of a 40% aqueous solution of tetraethylammonium hydroxide (TEA) and 7 gm of a "seed" solution (see U.S. Pat. Nos. 3,574,538 and 4,340,573), thoroughly homogenized then adjusted to a total weight of 250 gm by adding $H_2O$. The mixture was reacted at 100° C. for 19 days, then filtered, washed, and dried. The product was analyzed by x-ray diffraction and shown to comprise ECR-18 contaminated with faujasite and chabazite in minor amounts.

EXAMPLE 2

The reaction mixture of Example 1 was repeated except that no "seed" solution was used. It was cold-aged for two days at room temperature, then reacted at 100° C. for five days. The product was ECR-18 contaminated with a small amount of zeolite G.

EXAMPLE 3

A reaction mixture having the following oxide composition:

1.8 $(TEA)_2O$: 0.6 $Na_2O$: $Al_2O_3$: 9 $SiO_2$: 135 $H_2O$ was made by first dissolving 18.8 gm sodium aluminate (Fisher Scientific Co.) in 40 gm $H_2O$, and 10.8 gm aluminum sulfate in 15 gm $H_2O$. To a 1.25 liter blender were added 125.8 gm Ludox HS-40, 126 gm TEAOH (40% wt.) and 9.25 gm seeds and thoroughly mixed. The aluminate and sulfate solutions were then slowly added with continuous mixing. The total weight of slurry was then increased to 350 gm by addition of water. Part of this mixture was reacted for five days at 150° C., after which time it comprised ECR-18 contaminated with a small amount of chabazite. SEM showed the ECR-18 to comprise 50 to 10$\mu$ aggregates of 0.2 to 0.5$\mu$ crystals having an $SiO_2/Al_2O_3$ ratio of 6.4 (analyzed by microprobe).

EXAMPLE 4

Figure 1:
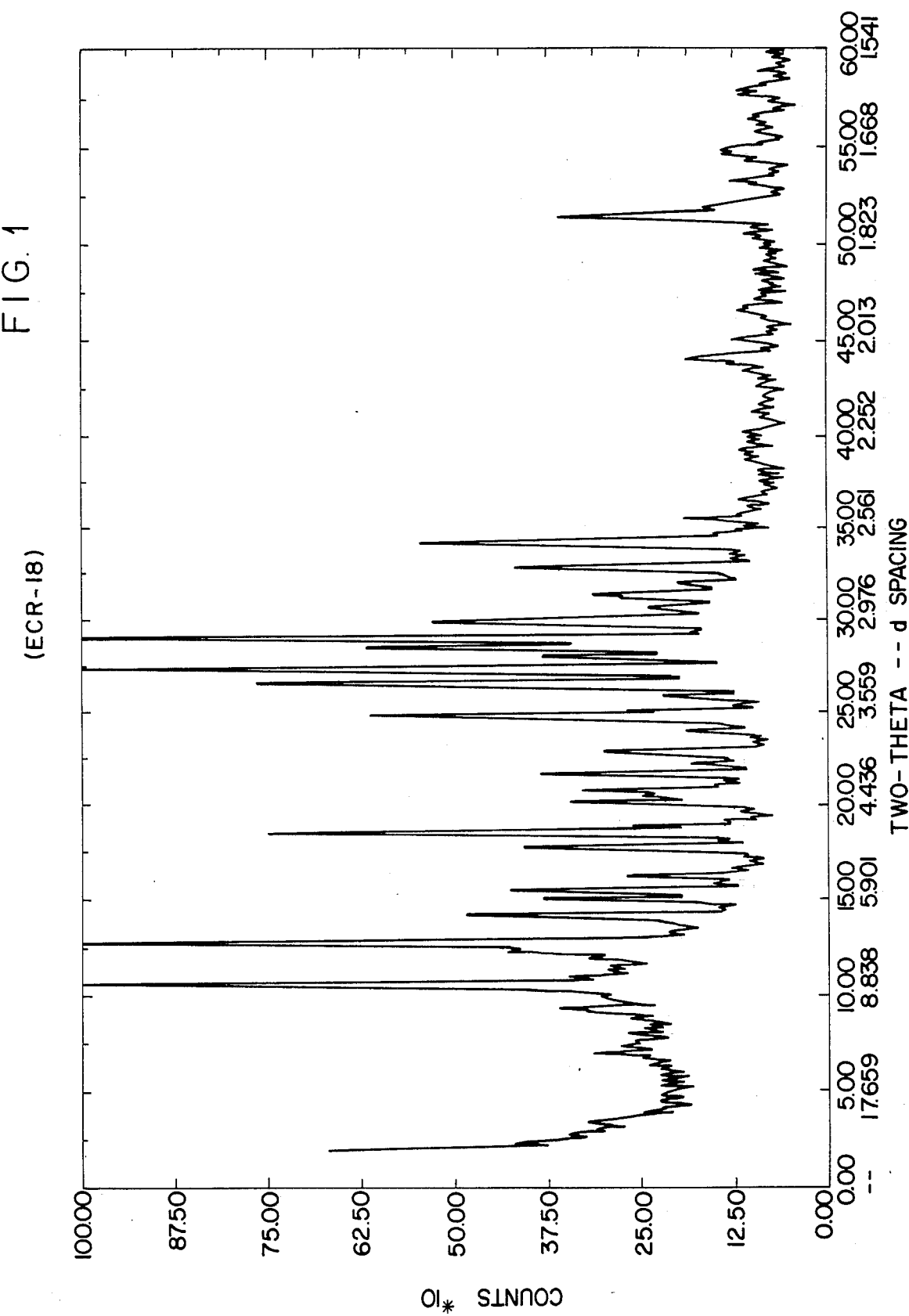

The remaining reaction mixture of Example 3 was heated at 100° C. for 15 days. The resulting product was pure ECR-18. The x-ray diffraction pattern for this product is found in FIG. 1 and tabulated in Table 2 where it is compared with the pattern reported for paulingite by Kamb et al, supra. The thermogravimetric analysis (TGA) of the product is shown in FIG. 2. The TEA cation appears to decompose at about 390° C.

The overall chemical composition of the assynthesized product is:

(TEA,Na)$_2$O:Al$_2$O$_3$:6.2SiO$_2$:5.4H$_2$O.

After decomposition of the TEA cation, the composition was:

0.72Na$_2$O:Al$_2$O$_3$:6.2SiO$_2$.

TABLE 2

| h | k | l | ECR-18 | | | Paulingite | |
|---|---|---|--------|------|-----|------------|-----|
|   |   |   | 2θ | d | I | d | I |
| 1 | 1 | 0 | 3.51 | 25.1 | 4 | | |
| 2 | 2 | 0 | 7.08 | 12.5 | 9 | 12.37 | 10 |
| 3 | 2 | 1 | 9.39 | 9.41 | 15 | 9.45 | 10 |
| 3 | 3 | 0 | 10.66 | 8.29 | 80 | 8.29 | 100 |
| 4 | 2 | 0 | | | | 7.86 | 10 |
| 4 | 2 | 2 | 12.41 | 7.13 | 11 | 7.14 | 20 |
| 4 | 3 | 1 | 12.83 | 6.90 | 93 | 6.88 | 100 |
| 4 | 4 | 0 | 14.25 | 6.21 | 44 | 6.21 | 40 |
| 4 | 4 | 2 | 15.12 | 5.85 | 22 | 5.86 | 50 |
| 6 | 1 | 1 | 15.53 | 5.70 | 23 | 5.70 | 50 |
| 5 | 4 | 1 | 16.33 | 5.42 | 16 | 5.42 | 30 |
| 5 | 5 | 0 | 17.82 | 4.97 | 40 | 4.96 | 50 |
| 5 | 5 | 2 | 18.55 | 4.78 | 62 | 4.78 | 90 |
| 6 | 4 | 2 | 18.89 | 4.69 | 12 | 4.68 | 30 |
| 7 | 3 | 0 | 19.24 | 4.61 | 3 | | |
| 8 | 0 | 0 | 20.23 | 4.39 | 31 | 4.385 | 40 |
| 6 | 4 | 4 | 20.83 | 4.26 | 30 | 4.25 | 40 |
| 7 | 4 | 3 | 21.75 | 4.08 | 31 | 4.08 | 40 |
| 7 | 5 | 2 | 22.34 | 3.977 | 12 | | |
| 8 | 3 | 3 | 22.92 | 3.876 | 24 | 3.875 | 40 |
| 7 | 5 | 4 | 24.05 | 3.698 | 8 | 3.694 | 20 |
| 8 | 4 | 4 | 24.83 | 3.582 | 73 | 3.582 | 80 |
| 8 | 6 | 2 | 25.94 | 3.432 | 12 | 3.440 | 10 |
| 7 | 6 | 5 | 26.62 | 3.346 | 77 | 3.346 | 80 |
| 8 | 6 | 4 | 27.35 | 3.258 | 100 | 3.261 | 90 |
| 9 | 5 | 4 | 28.06 | 3.178 | 25 | 3.176 | 20 |
| 9 | 6 | 3 | 28.83 | 3.126 | 54 | 3.129 | 70 |
| 9 | 7 | 0 | 28.98 | 3.078 | 98 | 3.078 | 90 |
| 8 | 7 | 5 | 29.91 | 2.985 | 74 | 2.983 | 80 |
| 9 | 8 | 1 | 30.70 | 2.910 | 13 | | |
| 10 | 6 | 4 | 31.40 | 2.846 | 29 | 2.851 | 20 |
| 11 | 6 | 1 | 32.01 | 2.794 | 10 | 2.789 | 20 |
| 9 | 7 | 6 | 32.85 | 2.724 | 36 | 2.725 | 60 |
| 12 | 6 | 0 | 34.23 | 2.617 | 67 | 2.615 | 70 |
| 11 | 8 | 1 | 34.82 | 2.575 | 22 | 2.574 | 10 |
| 9 | 8 | 7 | 35.62 | 2.518 | 11 | 2.520 | 20 |
| 12 | 6 | 4 | 35.71 | 2.512 | 3 | | |
| 10 | 10 | 0 | | | | 2.484 | 10 |
| 10 | 9 | 5 | 36.69 | 2.447 | 7 | 2.448 | 10 |
| 13 | 8 | 3 | 39.97 | 2.254 | 5 | | |

I claim as my invention:

1. A synthetic zeolite containing tetraethylammonium ion which is isostructural to the mineral paulingite.

2. A synthetic zeolite having an overall chemical composition:

(TEA,Na)$_2$O:(Al,Ga)$_2$O$_3$:3-20 SiO$_2$ and substantially the x-ray diffraction pattern shown in Table 1.

3. The synthetic zeolite of claim 2 wherein the overall chemical composition is:

(TEA,Na)$_2$O:Al$_2$O$_3$:4 to 10 SiO$_2$.

4. The synthetic zeolite of claim 2 wherein the void volume of the zeolite is greater than 0.40 cc/cc of zeolite.

5. A process for preparing the zeolite of claim 2 which comprises:
(a) preparing a reaction mixture comprising an oxide of sodium, water, a source of silica, a source of alumina, a tetraethylammonium ion source and, sodium aluminosilicate nucleating seeds, said reaction mixture having a composition, in terms of mole ratios of oxides, within the following ranges:

| Na$_2$O:Al$_2$O$_3$ | 0.4 to 3.4 |
| (TEA)$_2$O:Al$_2$O$_3$ | 0.8 to 4.5 |
| SiO$_2$:Al$_2$O$_3$ | 4 to 22 |
| H$_2$O:Al$_2$O$_3$ | 80 to 360 | and said seeds being present in an amount to yield 0.1 to 10 mole percent of the total final alumina content in said zeolite;
(b) blending the reaction mixture sufficiently to form a substantially homogeneous mixture;
(c) maintaining the reaction mixture at between about 80° C. and 220° C. under autogenous pressure for a sufficient period of time to form crystals of said zeolite; and
(d) recovering said zeolite crystals.

6. The process of claim 5 wherein the zeolite has a composition, in terms of mole ratios of oxides, in the range:

(TEA,Na)$_2$O:Al$_2$O$_3$:3 to 10 SiO$_2$.

7. The process of claim 5 wherein the source of silica is sodium silicate and the sources of alumina are sodium aluminate and an aluminum salt selected from the group consisting of the chloride, sulfate and nitrate salts.

8. The process of claim 5 wherein the reaction mixture is maintained between 90° and 180° C.

9. The process of claim 5 wherein the seeds are present in an amount to yield 1 to 20 mole percent of the total final alumina content.

* * * * *

Disclaimer and Dedication 4,661,332.—*David E. W. Vaughan*, Flemington; *Karl G. Strohmaier*, Port Murray, both of N. J. ZEOLITE (ECR-18) ISOSTRUCTURAL WITH PAULINGITE AND A METHOD FOR ITS PREPARATION. Patent dated Apr. 28, 1987. Disclaimer and Dedication filed Apr. 19, 1990, by the assignee, Exxon Research and Engineering Co.

Hereby disclaims and dedicates to the Public the remaining term of said patent.

[ *Official Gazette July 10, 1990* ]